(No Model.)
D. W. JOHNSON.
SEALING DISK FOR JARS, &c.
No. 408,177. Patented July 30, 1889.
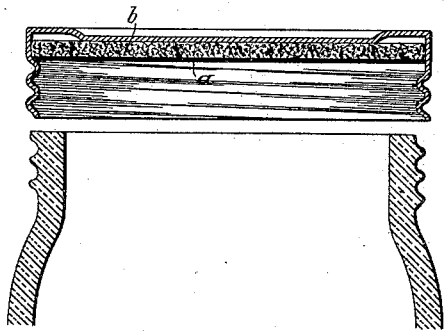
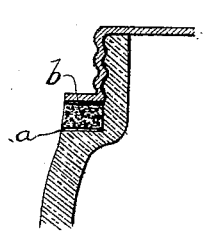 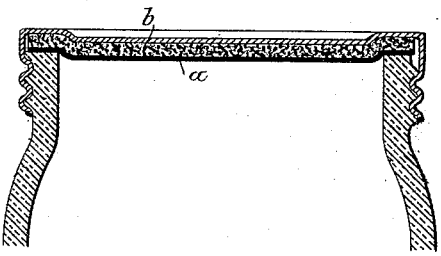
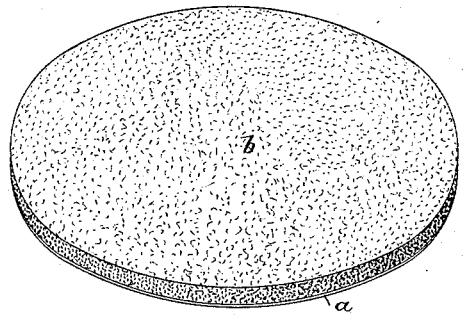 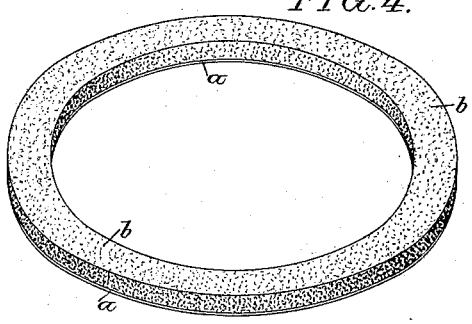
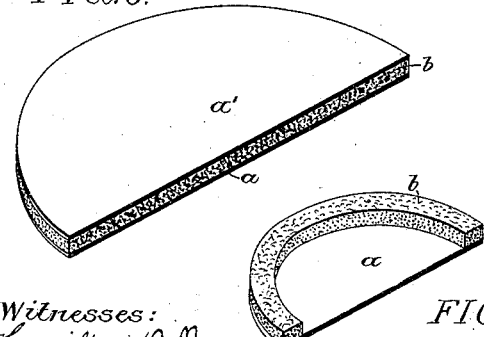 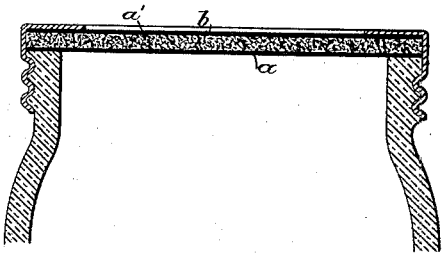
Witnesses:
Hamilton D. Turner
William D. Conner
Inventor:
Daniel W. Johnson
by his Attorneys
Howson & Howson

UNITED STATES PATENT OFFICE.

DANIEL W. JOHNSON, OF PHILADELPHIA, PENNSYLVANIA.

SEALING-DISK FOR JARS, &c.

SPECIFICATION forming part of Letters Patent No. 408,177, dated July 30, 1889.

Application filed February 16, 1889. Serial No. 300,095. (No model.)

*To all whom it may concern:*

Be it known that I, DANIEL W. JOHNSON, a citizen of the United States, and a resident of Philadelphia, Pennsylvania, have invented certain Improvements in Sealing-Disks for Jars, &c., of which the following is a specification.

The object of my invention is to provide a simple and effective sealing-gasket for jars, bottles, boxes, and like receptacles.

In the accompanying drawings, Figure 1 is a sectional view of the upper portion of a jar with a detached cap having my improved sealing-gasket in position therein. Fig. 2 is sectional view showing the jar sealed. Fig. 3 is a perspective view of the gasket. Figs. 4, 5, and 6 are views of other forms of gasket embodying the invention; and Fig. 7 is a sectional view showing the gasket, Fig. 5, in position on a jar. Fig. 8 is a view showing the gasket or ring on the outside of the jar-mouth.

Disks or washers for sealing-jars and other vessels having removable lids, and which are required to be air-tight, have usually been made of rubber, leather, or paper; but I have found by experiments that neither of these will keep the vessel absolutely air-tight. Of the three rubber is to be preferred; but this deteriorates and loses its elastic properties, and if used as a seal in direct contact with the articles to be preserved often taints them. Leather is also objectionable on the same account, and paper has not sufficient elasticity to make a tight joint.

I have found by experiments that by making a water-proof sealing-gasket of parchment or parchmentized fiber, or their equivalents, secured to a felted body, I am enabled to hermetically seal the vessel, while at the same time the parchment will have no deteriorating effect upon the contents of the vessel.

Referring to Fig. 3, $a$ represents a disk of parchment or parchmentized fiber, which is impervious to moisture, and to which is cemented in any suitable manner a disk $b$, of any suitable felted material—such as wool, paper, &c.—providing a soft and elastic backing for the parchment. This combined felt and parchment washer is placed in the cap of a jar, as in Fig. 1, for instance, and when the cap is screwed into position, as in Fig. 2, the felt between the cap and the seat around the mouth of the vessel will be tightly compressed, making an air and water tight joint, while at the same time the contact of the contents of the vessel with the parchment will not injuriously affect said contents.

In Fig. 4 I have shown the gasket in the form of a ring, which is used in the same manner as a rubber ring, being, for instance, seated on the shoulder of a jar, as shown in Fig. 8.

Fig. 5 shows a gasket with parchment or parchment-paper disks $a\,a'$ on both sides and felted material $b$ between the two outer disks, this form of gasket being particularly available for use with a cap having an open center, as shown in Fig. 7. The disk $a'$ (shown in Fig. 5) may be of plain paper—that is to say, paper not waterproofed—so that a label can be readily pasted thereon.

In Fig. 6 I have shown a disk $a$, of parchment or other water-proof material, having secured to it a ring $b$, of felt, this ring being in such position as to be compressed between the cap and the seat around the mouth of the vessel, the center portion of the disk $a$, of water-proof material, being merely for the purpose of preventing the contents of the jar from coming in contact with the lid.

It will be understood that in place of the felt, as shown, a soft yielding woven fabric may be used; but I prefer in all cases to use the felt.

I claim as my invention—

1. A sealing-gasket for jars or other vessels, having a base of water-proof material backed with and secured to a felted material, substantially as described.

2. A sealing-gasket consisting of a body of felted material having water-proof material secured to its opposite faces, substantially as described.

In testimony whereof I have signed my name to this specification in the presence of two subscribing witnesses.

DANIEL W. JOHNSON.

Witnesses:
WILLIAM D. CONNER,
HENRY HOWSON.